Dec. 26, 1939.     N. WEINSTEIN     2,185,047
APPARATUS FOR AIR CONDITIONING
Filed June 5, 1939
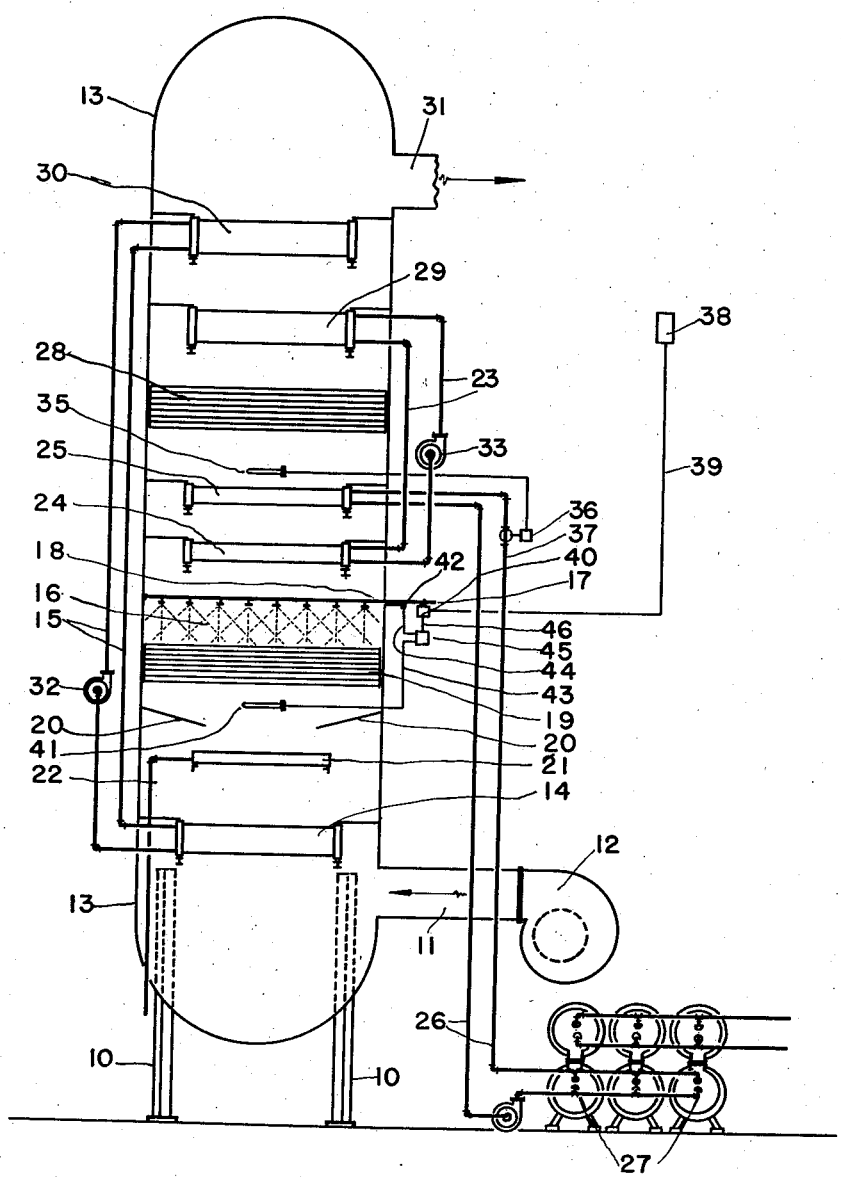
INVENTOR
Norman Weinstein
BY Arthur T. Holmes
ATTORNEY Patented Dec. 26, 1939

2,185,047

UNITED STATES PATENT OFFICE 2,185,047

APPARATUS FOR AIR CONDITIONING

Norman Weinstein, Chicago, Ill., assignor to The Trane Company, La Crosse, Wis.

Application June 5, 1939, Serial No. 277,412

10 Claims. (Cl. 62—2)

The object of my invention is to provide an apparatus for conditioning air, particularly compressed air, for use in blast furnaces.

Another object of my invention is to provide a sequence of cooling and re-heating stages for conditioning air whereby the air may be economically dehumidified and re-heated in a comparatively small space.

Another object of my invention is to provide an apparatus which will condition compressed air in stages by dehumidifying it and subsequently re-heating it so that the air conditioned will have a uniform moisture content and a uniform dry bulb temperature.

Another object of my invention is to provide a means of control whereby the conditioned air will be uniform as to moisture content and dry bulb temperature.

It is well known that the use of air is of great importance in the making of steel, particularly with Bessemer furnaces and that air with a uniform humidity and temperature will aid in the production of a more uniform quality of steel and will result in economy of fuel as it ordinarliy is necessary to vaporize the water in the air.

The foregoing and many other specific features of my invention are set forth in the following specification, where I describe what I consider the preferred embodiments of my invention. They are illustrated in the accompanying drawing, wherein The figure is a cross-section in front elevation of the apparatus showing diagrammatically the means of accomplishing my invention.

Referring to the figure, 12 represents a pressure type blower forcing air through the casing 13 from the inlet 11 to the outlet 31 preparatory to entrance into blast furnaces, which are not shown. The casing 13, which may be in either a vertical or horizontal position, is shown in the figure to be in a vertical position and raised from the ground by supports 10.

It is estimated that the temperature of the air by being compressed by a compressor or the blower will be 220° dry bulb temperature with 106.5° dewpoint temperature with a water vapor content of 10.07 grains per cubic foot.

The air stream after entering the casing passes through a cooling coil 14. The cooling coil 14 is a coil designed to reduce the entering air from 220° dry bulb and 106.5° dewpoint to 110 dry bulb and 106.5° dewpoint, removing from said air only sensible heat. From the cooler 14 the air passes through a spray 16, which is a direct spray cooler using water of approximately 70° F., whereby the temperature of the air is reduced to 71° saturated.

The water enters the spray cooler through the pipe 17 and is released into the spray chamber through nozzles 18. Eliminator plates 19 (Raschig rings) are employed to increase the efficiency of the spray chamber. Louvres 20 are used to deflect the condensate of the spray into a drip pan 21 from which the water passes to a drain or sewer through a pipe 22. From the spray 16 the air passes through a cooling coil 24, which reduces the temperature of the air from 71° saturated to 54.5 saturated. This cooling coil 24 is the cold side of a heat cycle and abstracts both sensible and latent heat from the air.

The air stream is then passed through a cooling coil 25, preferably using brine to reduce the air from 54.5° saturated to a leaving condition of 35° saturated. The air then passes through eliminator plates 28 (employing Raschig rings), whereby the entrained moisture is precipitated. The air stream is then passed through a heating coil 29, which reheats the air from 35° F. saturated to a 65° F. dry bulb and a 35° F. dewpoint. The heating coil 29 restores to the air as sensible heat both the latent and sensible heat which the cooling coil 24 abstracted. The air then passes through a heating coil 30, which heats the air from 65° dry bulb and 35° dewpoint to 175° dry bulb and 35° dewpoint, thus restoring to the air as sensible heat the sensible heat abstracted by the cooling coil 14. The air after passing through the heating coil 30 leaves the apparatus through an outlet 31 and passes to the blast furnaces. Additional heating means may be interposed at this point to attain any dry bulb temperature required.

The cooling coil 14 and the heater 30 are connected by a pipe circuit 15 to form a heat cycle, and there is interposed in the pipe circuit 15 a pump 32 to circulate the heat exchange medium from the cooler 14 to the heater 30, whereby the same amount of heat that is removed from the air by the cooling coil 14 is again added to the air by the heating coil 30.

The cooling coil 24 and the heating coil 29 are connected by a pipe circuit 23 to form a heat cycle, and a pump 33 is interposed in the pipe circuit 23 to circulate the heat exchange medium from the cooling coil 24 to the heating coil 29 and back again, whereby the same amount of heat, both latent and sensible, that is removed from the air by the cooling coil 24 is again added to the air as sensible heat by the heating coil 29.

The cooling coil 25 is supplied with a cold heat exchange medium, preferably brine from the refrigerating compressor 27, through a pipe circuit 26. 27 is a self-contained unit which supplies water of a constant temperature to the cooling coil 25.

The spray 16 is used because water in a natural or untreated condition is always available in large quantities at approximately 70°. This spray water may be colder if well water or water from a cooling tower is used, but it is not contemplated to cool this water by mechanical refrigeration. A cooling coil employing water as the cooling agent may be substituted for the spray.

In order to show the advantage of the system and apparatus which I show herein, I refer to a typical problem of cooling 50,000 C. F. M. of free air, which after being compressed enters the unit at 170° dry bulb temperature and a moisture content of 105 grains of moisture per pound of dry air, to a final state of 150° dry bulb temperature and an absolute humidity of 12.2 grains of moisture per pound of dry air. The conditioning of the air as set forth in the above example could be obtained by means of a single cooling coil, such as coil 25, and one heat cycle as shown by coils 14 and 30, but with such an arrangement mechanical refrigeration with a total capacity of 400 tons would be required. However, by means of my method of dehumidifying and reheating I am able to reduce the refrigeration load from 400 tons to 192 tons and at the same time reheat the air to nearly the entering air temperature.

This is accomplished by using two heat cycles and interposing between the cooling coils of the respective heat cycles a water spray. If only one heat cycle were used without the spray, the required capacity would be 400 tons. If only one heat cycle were used with the spray, the required refrigeration could be reduced to 192 tons but the air could not be reheated to the required final temperature. Furthermore, this would require more spray water because more heat would have to be absorbed from the air by the spray water. This also would require greater area and surface and additional space. Moving the spray to a position ahead of the cooling coil of the first heat cycle would give the same result as eliminating the first heat cycle. Moving the spray to a position after the cooling side of the second heat cycle would be the same as eliminating the second heat cycle, and the result would be the same as if only one heat cycle were used.

If only the outer heat cycle is used with the spray cooler, then there are two alternative results. First, if sufficient heat is removed to lower the required mechanical refrigerating capacity to 192 tons, there will not be sufficient heat available to reheat the air to the desired final dry bulb temperature without resort to an outside source of heat; second, if sufficient heat is removed by the cooling side of the heat cycle to reheat the air to the desired final dry bulb temperature, then the required capacity of the mechanical refrigerating plant will be greater than 192 tons. The reason for this is that if sufficient heat for reheating is removed by the cooling side, the temperature of the air entering the spray cooler will be lowered and, hence, the heat that can be removed by the spray water of natural temperature from the air is limited and will be less than it was in the previous case.

The control of the operation is as follows: A thermostat 35 measuring the dewpoint is placed in the path of air after it has passed through coil 25. This thermostat is operatively connected with a valve 36 interposed in the pipe 37 so as to control the flow of water to the coil 25. The valve may be of the modulating type. The thermostat 35 might also be operatively connected by a rotating switch with the chilled water units 27 so as to cut out or in various chilled water units, responsive to the dewpoint at the thermostat 35. The effect of the thermostat 35 operating to close or open the valve 36 is to regulate the supply of water to the coil 25 responsive to the dewpoint temperature of air at 35, while the effect of the thermostat 35 operating to cut in or out various chilled water units is to regulate the temperature of the water flowing to coil 25 responsive to the dewpoint temperature of air at 35. Either method regulates the effective cooling by the cooling coil 25.

Another control is effectuated by a thermostat 38 positioned in outside air operatively connected through a line 39 with a valve 40 interposed in the line 17 supplying spray water to the sprays, so that at a predetermined outside temperature the valve 40 will shut off and stop the sprays. This is necessary to prevent freezing and to prevent waste of water when the water cannot be efficiently used.

The spray water may be also controlled by a differential thermostat comprising bulb 41 measuring the wet bulb of the air prior to passing through the sprays, and bulb 42 measuring the temperature of the water in the pipe 17. Both bulbs 41 and 42 are respectively connected by conduits 43 and 44 with mechanism 45, which in turn is operatively connected with the valve 40 by the line 46. This is a conventional thermostat and the operation is such that when the temperature of the spray water reaches a point, for example, five degrees greater than the wet bulb of the air as measured by bulb 41, the mechanism 45 would operate to shut off the valve 40.

I claim:

1. An air conditioning apparatus comprising a casing, and air inlet and outlet, means to compress and force air through said casing, conditioning means interposed in path of said air in the following order, a cooling coil, a spray, a second cooling coil, a third cooling coil, a heating coil in operative connection with the second cooling coil to form a heat cycle, and a second heating coil in operative connection with the first cooling coil to form a heat cycle, and thermostatic means responsive to the dewpoint of the air after it has passed through the third cooling coil to regulate the effective cooling of said third cooling coil.

2. An air conditioning apparatus comprising a casing, an air inlet and outlet, means to compress and force air through said casing, conditioning means interposed in path of said air in the following order, a cooling coil, a spray, a second cooling coil, a third cooling coil, a heating coil in operative connection with the second cooling coil to form a heat cycle, and a second heating coil in operative connection with the first cooling coil to form a heat cycle, means to control said spray responsive to outside temperature.

3. An air conditioning apparatus comprising a casing, an air inlet and outlet, means to compress and force air through said casing, conditioning means interposed in path of said air in the following order, a cooling coil, a spray, a second cooling coil, a third cooling coil, a heating coil in operative connection with the second cooling coil to form a heat cycle, and a second heating coil in operative connection with the first cooling coil to form a heat cycle, means to control said spray responsive to a predetermined differential between the temperature of the water entering the spray and the wet bulb temperature of the air entering said spray.

4. An air conditioning apparatus comprising a casing, an air inlet and outlet, means to compress and force air through said casing, conditioning means interposed in path of said air comprising cooling means in four stages, a cooling coil, a spray, a second cooling coil, and a third cooling coil, each stage being of a lower temperature than the preceding stage, heating means in two stages, a heating coil, a second heating coil being of a higher temperature than the first heating coil, said heating coils being respectively operatively connected with the first mentioned cooling coils to form separate heat cycles, the first cooling coil adapted to reduce only the dry bulb temperature of the air, the spray cooler adapted to reduce the dry bulb temperature and the dewpoint temperature of said air, the second cooling coil adapted to reduce the dry bulb temperature and the dewpoint temperature of the air, the third cooling coil adapted to reduce the dry bulb temperature and the dewpoint temperature of the said air, the first heating coil adapted to restore to the said air the latent heat and sensible heat removed from the air by the second cooling coil, the second heating coil adapted to restore to the said air the sensible heat abstracted by the said first cooling coil.

5. An air conditioning apparatus comprising a casing, an air inlet and outlet, means to compress and force air through said casing, conditioning means interposed in path of said air in the following order, a cooling coil adapted to reduce the dry bulb temperature of said air to approximately its dewpoint temperature, a spray, a second cooling coil, a third cooling coil, adapted in successive stages to abstract both sensible and latent heat from said air, a heating coil in operative connection with the second cooling coil to form a heat cycle, and a second heating coil in operative connection with the first cooling coil to form a heat cycle.

6. An air conditioning apparatus comprising a casing, an air inlet and outlet, means to compress and force air through said casing, conditioning means interposed in path of said air in the following order, a cooling coil adapted to reduce the dry bulb temperature of said air to approximately its dewpoint temperature, a spray, a second cooling coil, a third cooling coil, adapted in successive stages to abstract both sensible and latent heat from said air, a heating coil in operative connection with the second cooling coil to form a heat cycle to restore to said air latent and sensible heat abstracted by said second cooling coil, and a second heating coil in operative connection with the first cooling coil to form a heat cycle to restore to said air sensible heat abstracted by said first cooling coil.

7. An air conditioning apparatus comprising a casing, an air inlet and outlet, means to compress and force air through said casing, conditioning means interposed in path of said air in the following order, a cooling coil, a spray, a second cooling coil, a third cooling coil, a heating coil in operative connection with the second cooling coil to form a heat cycle, and a second heating coil in operative connection with the first cooling coil to form a heat cycle.

8. An air conditioning apparatus comprising a casing, an air inlet and outlet, means to compress and force air through said casing, conditioning means interposed in path of said air comprising a cooling and heating cycle, a second cooling and heating cycle interposed within the first cooling and heating cycle, a spray cooler interposed between the cooling elements of the first and second cycles, a colder cooling coil interposed between the cooling and heating elements of the second cycle.

9. An air conditioning apparatus comprising a casing, an air inlet and outlet, means to compress and force air through said casing, conditioning means interposed in path of said air comprising cooling means in four stages, a cooling coil, a spray, a second cooling coil, and a third cooling coil, each stage being of a lower temperature than the preceding stage, heating means in two stages, a heating coil, a second heating coil being of a higher temperature than the first heating coil, said heating coils being respectively operatively connected with the first mentioned cooling coils to form separate heat cycles.

10. In an air conditioning apparatus, a casing having an air inlet and outlet, means to compress and force air through said casing, conditioning means in said casing interposed in the path of such air, said means comprising pairs of cooling and reheating coils through which heat exchange fluid is circulated, each of said reheating coils being in circuit with one of said cooling coils, the cooling coils of said pairs being presented to the air flowing through said casing in such order as to progressively extract heat from the entering air, and the reheating coils being presented to the air flowing through said casing to progressively reheat it prior to its leaving the casing, a water spray through which such air passes in an intermediate stage of its cooling, and refrigerating means between the cooling coils and the reheating coils.

NORMAN WEINSTEIN.